Aug. 18, 1953  D. A. MEEKER ET AL  2,649,293
SCALE
Filed June 7, 1946  4 Sheets-Sheet 1

INVENTORS
David A. Meeker
Kenneth C. Allen
BY
Marechal Biebel
ATTORNEYS

Aug. 18, 1953 — D. A. MEEKER ET AL — 2,649,293
SCALE
Filed June 7, 1946 — 4 Sheets-Sheet 2
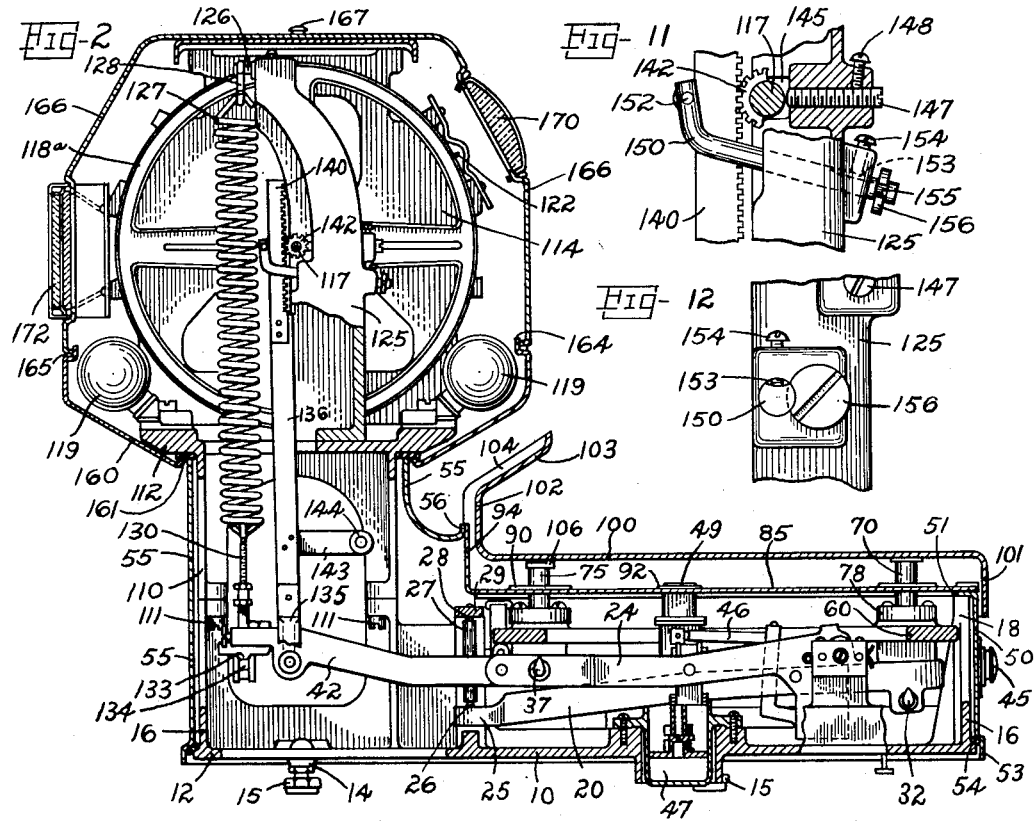
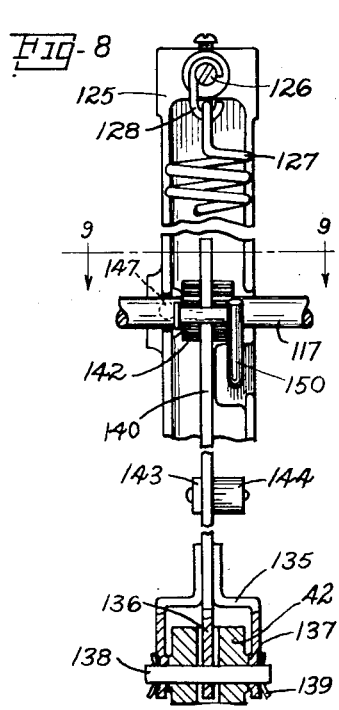
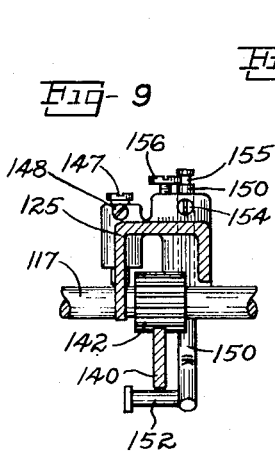
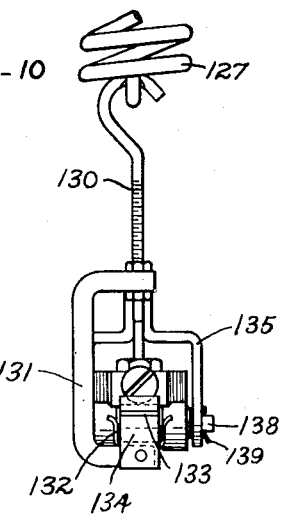
INVENTORS
David A. Meeker
Kenneth C. Allen
BY
Marechal & Biebel
ATTORNEYS

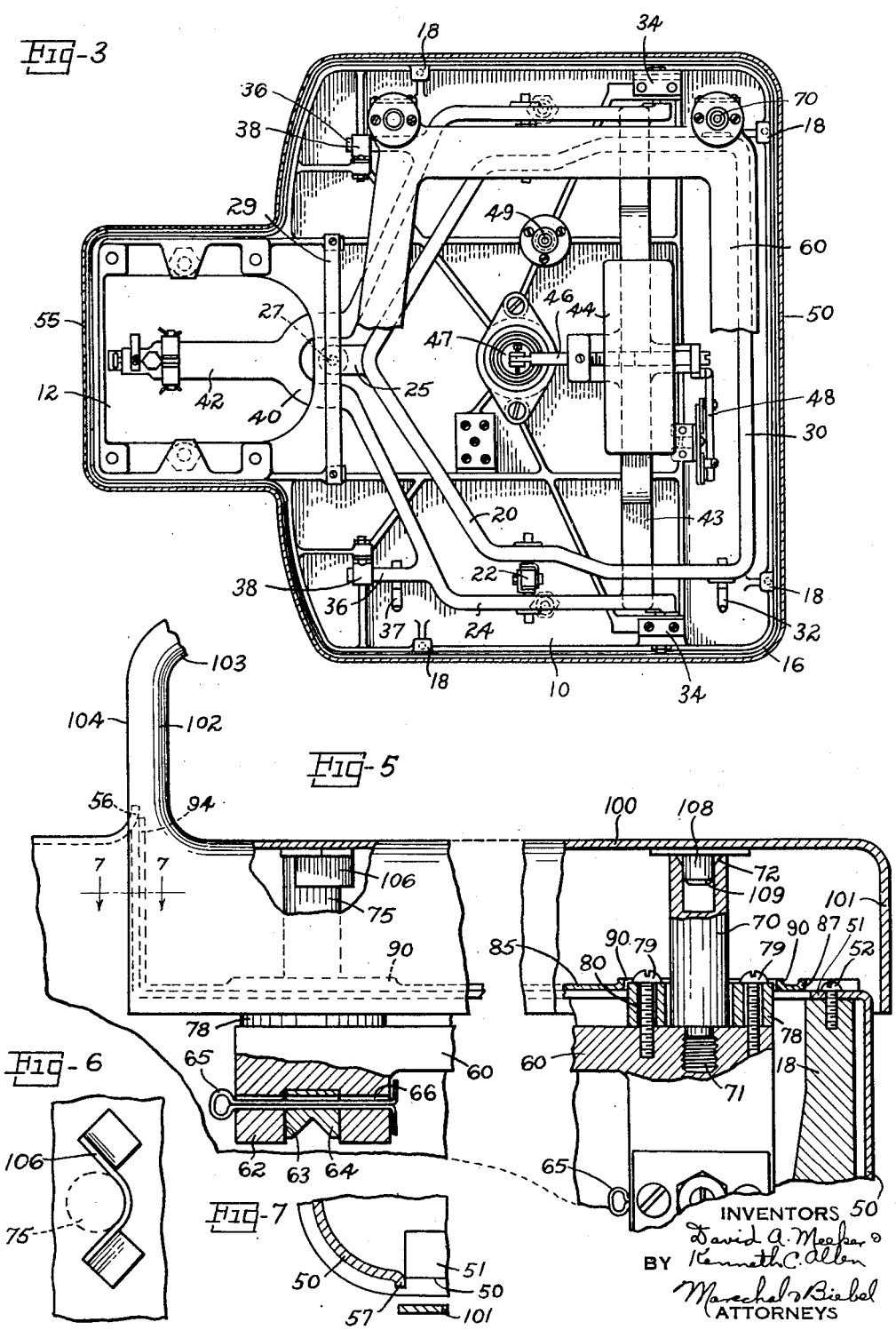

Aug. 18, 1953 D. A. MEEKER ET AL 2,649,293
SCALE
Filed June 7, 1946 4 Sheets-Sheet 4
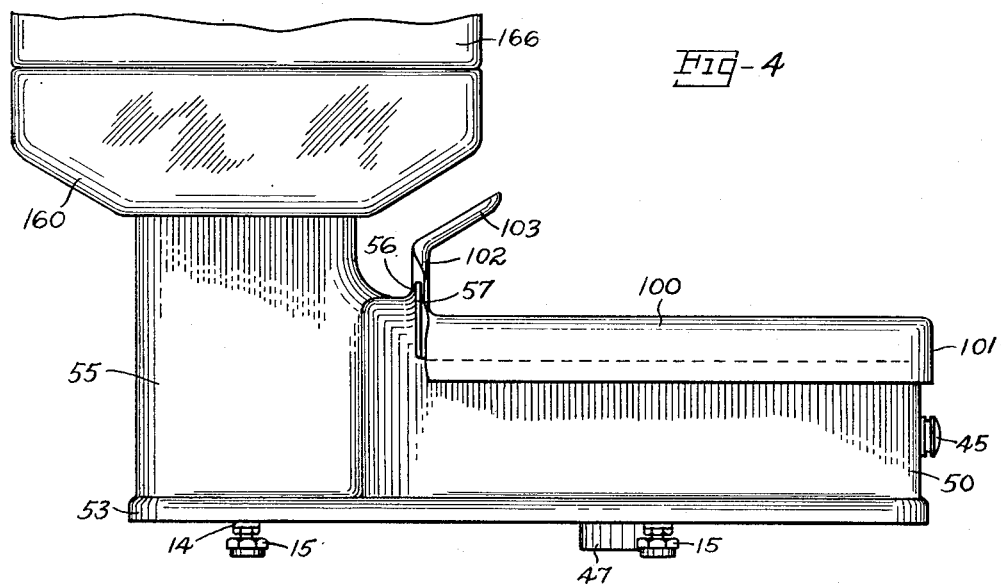
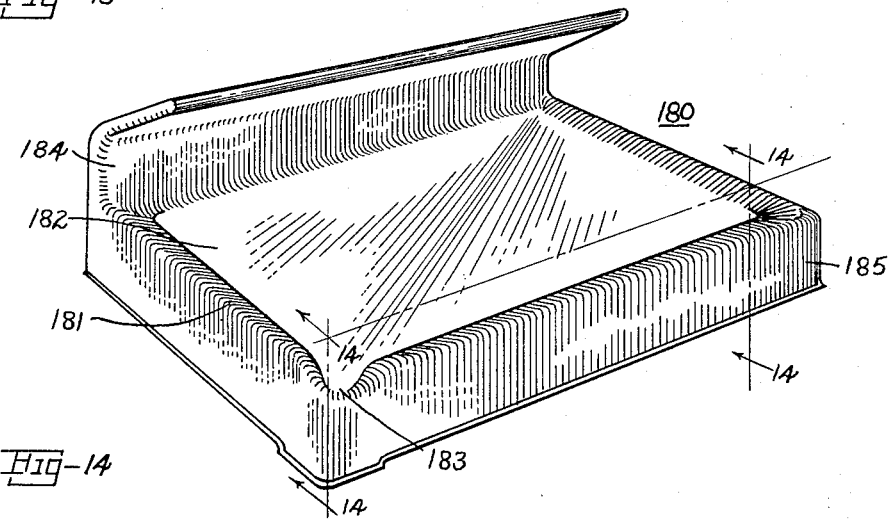
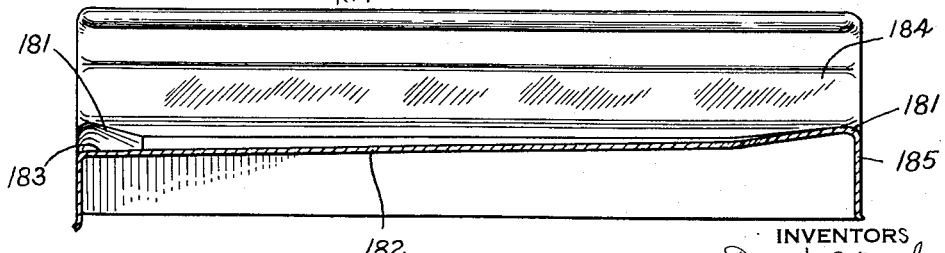
INVENTORS
David A. Meeker
BY Kenneth C. Allen
Marechal Biebel
ATTORNEYS

Patented Aug. 18, 1953

2,649,293

UNITED STATES PATENT OFFICE 2,649,293

SCALE

David A. Meeker, Troy, and Kenneth C. Allen, Dayton, Ohio, assignors to The Hobart Manufacturing Company, Troy, Ohio, a corporation of Ohio Application June 7, 1946, Serial No. 675,142

13 Claims. (Cl. 265—27)

This invention relates to weighing scales.

It is the principal object of the invention to provide a scale which is simple and compact in construction, which can be easily read by both clerk and customer, and which is fully protected and enclosed against access of dust, liquids, and other foreign matter.

It is also an object to provide a scale having a casing which is so constructed that it may be easily cleaned and washed while preventing access of the washing liquid to the interior of the scale mechanism.

It is a further object to provide a scale having a removable platter which is readily removed and replaced in operative position on the scale, the scale remaining substantially enclosed and protected both with the platter in operative position, and also when the platter is removed.

It is also an object to provide a novel platter adapted for use with such scale for weighing of articles which are wet such as fish, and the like, in which provision is made for drainage of the liquid while on the scale, the drainage taking place in such a manner as not to pass into the interior of the scale mechanism.

It is a further object to provide a scale including a drum chart and operating mechanism therefor including a rack and pinion which, notwithstanding shocks and sudden applications of load to the platter, are maintained in proper operative relation and substantially free of friction.

It is a still further object to provide a support for the drum chart which allows the drum to rotate freely and without objectionable friction, and allows a desirable yielding of the drum shaft upon application of load but protects the same against the possibility of objectionable misalignment or permanent deformation.

It is also an object to provide such a scale mechanism having a simple and direct application of the load to the counterbalancing springs and similar simple mechanism for securing direct and accurate operation of the chart upon movement of the lever.

Other objects and advantages will be apparent from the following description, the accompanying drawings and the appended claims.

In the drawings:

Fig. 2 is a side view in vertical section with the scale mechanism partially deflected showing the construction thereof;

Fig. 3 is a top plan view of the base with the platter and chart removed showing the lever mechanism and platter support;

Fig. 4 is a side elevational view of the outside casing of the scale;

Fig. 5 is a broken side elevational view on a larger scale with parts broken away to more clearly show the construction of the platter supporting mechanism;

Fig. 6 is a detail view looking toward the under side of the platter showing the bracket for limiting the movement of the platter while being placed in operative position;

Fig. 7 is a detail sectional view on line 7—7 of Fig. 5;

Fig. 8 is a broken detail view in end elevation and on an enlarged scale showing the subassembly of the counterbalance and chart rotating mechanism;

Fig. 9 is a horizontal sectional view on the line 9—9 of Fig. 8;

Fig. 10 is a similar view showing the construction of the counterbalance mechanism and the end of the lever;

Fig. 11 is a broken side elevational view showing details of the construction for maintaining proper rack and pinion operation;

Fig. 12 is a front elevational view of the mechanism shown in Fig. 11;

Fig. 13 is a view in perspective of a platter adapted to receive wet articles to be weighed; and Fig. 14 is a vertical sectional view through such platter on the line 14—14 of Fig. 13.

Figure 1:
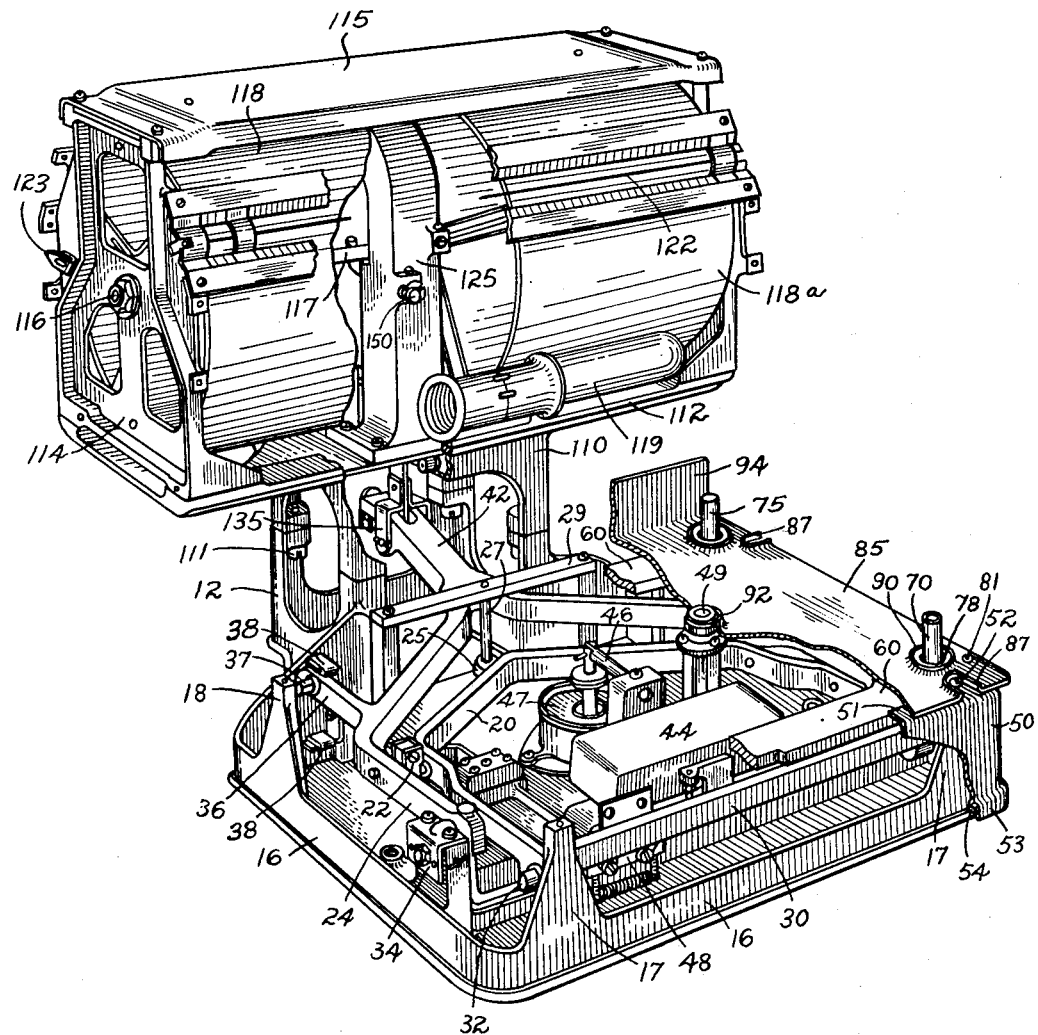
Fig. 1 is a view in perspective of a scale constructed in accordance with the present invention with the greater part of the housing being removed.

Referring to the drawings which disclose a preferred embodiment of the invention, the scale is shown as having a base 10 made of a ribbed casting as shown in Fig. 3 with a narrower rearwardly extending portion 12 substantially centrally arranged. The casting is formed with bosses 14 within which the adjustable feet 15 are received to provide for leveling the base upon its support. The casting also incorporates an integral upwardly turned flange 16 which extends substantially around the entire periphery of the base. Adjacent the four corners of the main portion of the base the flange is of greater upward extent as shown at 17 and terminates in four upstanding supports 18 upon which the external casing is adapted to be received.

The weighing mechanism is preferably of the double lever type, and the two levers being of hollow generally rectangular shape and one being interfitted within the other as shown in Fig. 1. The inner lever 20 is pivoted on floating links 22 which are carried at intermediate points on outer lever 24. The rearward end 25 of lever 20 is fulcrumed by engagement of a projection 26 having an upstanding conical end with a recess in the lower end of pin 27. The upper end of this pin has a similar recess which engages a conical projection 28 fixed to the cross bar 29 suitably supported from opposite ends upon portions of the base casting. This provides a fixed point for preventing vertical travel of the rearward end of the lever 20 but allows for freedom of movement thereof in a horizontal plane. The forward end of the lever 20 is shown at 30, and adjacent the forward part thereof it is provided with the pivots 32 forming supports for the forward end of the platter.

The outer lever 24 is pivoted on fulcrum bearings 34 which are fixed to the base 10, and is provided with arms 36 extending rearwardly on which are secured pivots 37 forming supports for the rearward end of the platter. Fixed upper and lower resilient stop members 38 are also supported from the base and engage the arms 36 to limit the travel of outer lever 24.

Lever 24 has a looped portion 40 which extends around the rearward end of lever 20, and around pin 27, ending in a rearwardly extending portion 42 which extends into the rearward extension 12 of the base.

The outer lever 24 also incorporates a transversely extending arm 43 which is offset from the pivot axis and on which there is mounted the zero adjustment weight 44, access thereto being made possible by removal of a plug 45 from the front of the scale. The arm 43 carries another arm 46 which engages the movable portion of the dash pot 47 the fixed portion of which is secured in the base 10 substantially centrally thereof. Movement is also imparted to a Micro-Switch 48 for control of the lights in response to the application of a load to the platter. A level 49 is also preferably mounted in a suitable location upon the base.

The base is enclosed by a casing member 50, preferably enameled, which has an inner-turned top flange 51 adapted to be received upon the respective supports 18 and to which it is secured by means of screws 52. This casing member extends downwardly to the lower part of the base where it has an offset portion 53 engaging a sealing member 54 in the form of a band of rubber-like material which thus forms a closed and sealed connection around the entire periphery of the base.

It should be noted that this casing member 50 has a portion 55 which extends around the rearward projection 12 of the base in an integral and continuous manner. Immediately in front of the projection 12, casing portion 55 is formed with a forwardly and upwardly curved flange portion 56 (Fig. 2) and this flange continues laterally to the sides and downwardly thereover and outwardly as shown at 57 in Figs. 4 and 7 to thus continuously deflect washing fluid or other materials away from the scale interior and toward the impervious and continuous portion of the casing. Thus any liquid dropped onto the exterior of the scale or applied for washing purposes, or any solid such as sugar or other commodity being weighed, is deflected away from the casing opening, and is caused to flow laterally and downwardly below the scale without gaining access to the interior thereof.

A generally rectangular platter receiving frame 60 is arranged to be received on the respective pairs of pivots 32 at the forward side and 37 at the rearward side. This unitary casting has downwardly formed projections 62 which are milled to provide an accurately formed groove 63 receiving the V-bearing 64 therein as shown in Fig. 5. The groove is accurately formed with only enough clearance to allow the V-bearing to be easily inserted and removed and it is held in place by means of a cotter pin 65 inserted through a drilled opening 66. A similar arrangement is provided for fulcrum bearings 34, and a simple and accurate construction is thus provided which can be quickly and accurately assembled and disassembled.

A pair of posts 70 extend upwardly adjacent the forward corners of casting 60. As shown in Fig. 5 each post has a threaded part 71 by means of which it is secured to the casting 60 and these posts 70 have tapered recesses 72 in their upper ends for receiving the platter thereon. A second pair of posts 75 is similarly mounted adjacent the rearward corners of frame 60 and similarly extend upwardly. The upper ends of posts 75 are flat. Around each of the four posts and immediately above casting 60 are sealing collars 78 which are secured in place by means of screws 79 having clearances 80 to allow for lateral adjustment of the collars.

A closure plate 85 is mounted over the top of the base and in position to overlap flanges 51 on the casing 50. Plate 85 is secured to the upper surface of casing 50 by means of a series of screws 81, and has raised notches 87 to clear the fastening screws 52 which secure casing 50 in place.

Plate 85 is also formed with a series of flanged openings 90 through which collars 78 may extend in the raised position of the platter mechanism. Because of the ability to center and properly locate collars 78, after the assembly of the scale is substantially completed, a relatively close clearance may be provided so that the scale remains highly dust and dirt proof and substantially sealed when collars 78 occupy their upper positions as shown in Fig. 5. A similar flanged opening 92 provides for receiving the level 49.

Plate 85 likewise includes a rearward upturned flange 94 which is received directly against the flanged portion 56 of casing 50, thus closing the top of the scale and preventing passage of foreign matter thereinto at this junction line. As previously explained, the fact that flange 56 turns upwardly assures that any liquid falling onto this portion of the scale will be deflected away from the opening and toward the impervious portion of casing 50, thus maintaining the desired continuously closed and sealed construction.

The platter is shown at 100 and is formed with a down-turned marginal flange 101 which extends around three sides, overlapping the plate 85 and the upper portion of casing 50 in all positions so that further assurance is provided that any foreign matter will not enter the base of the scale but will be deflected downwardly and thus away from the interior of the scale. At its rearward part the platter has an upwardly extending portion 102 and a forwardly and upwardly inclined part 103 is provided in compliance with certain state regulations to avoid the possibility of wedging a commodity between the platter and an overhanging part of the chart housing. The end wall 102 preferably has laterally extending flanges 104 which overlap laterally with plate 94 and the upper curved end of flange 56, to enclose this junction and to further prevent passage of foreign matter into this area.

In order to provide for the ready removal and repositioning of the platter on the posts 70 and 75 in proper operative relation, a pair of open-ended of Y-shaped brackets 106 (Figs. 5 and 6) are secured to the lower side of the platter in properly spaced relation and in such manner that they engage the respective posts 75 when the rearward end of the platter is moved into operative position. At the forward end, a pair of pins 108 having tapered ends 109 are similarly located so that when this end of the platter is lowered into position, the pins will index in their respective openings 72 of posts 70 and thus accurately locate the platter in proper position. This action is rapid and easy to perform, and assures proper assembly of the platter without difficulty.

In order to support the chart and the mechanism associated therewith, a bracket 110 is bolted to the rearward base portion 12 by means of a series of bolts 111, the bracket being formed with a frame member 112 in over-hanging relation thereto. End plates 114 are bolted in laterally spaced upstanding relation and at their upper ends are joined by top plate 115, forming a light but strong support for the chart and its operating mechanism.

End plates 114 carry bearings 116 in which there is journaled the shaft 117 on which the drum chart is mounted. The chart is formed in two sections 118 and 118a which are mounted on shaft 117 with a central space therebetween within which there is arranged the counterbalancing and chart actuating mechanism. Lights 119 are suitably arranged to be controlled by switch 48 to illuminate the chart for both the clerk and customer.

The end plates 114 also provide supports for the reading index 122 on the clerk's side, and a similar index 123 on the customer's side. As shown in Fig. 2, the reading on the clerk's side is preferably arranged at an upwardly inclined angle so that a clerk standing in a raised position can readily and accurately read the chart, while the reading for the customer is conveniently arranged on a horizontal line. Preferably additional mountings are provided on both sides of the scale so that the reading indices can be located as desired.

The frame 112 likewise supports a bracket 125 which extends upwardly in the central space between the two sections of the chart, overhanging at its upper end the drum shaft 117. At its upper end the bracket carries a fixed pin 126 on which the upper end of the counterbalancing spring 127 is secured by means of hook 128. The spring extends downwardly between the two chart sections as shown.

At its lower end, a link 130 connects with the spring and is connected to an arm 131 which has a saddle or clip 132 within which the nose iron 133 carried at the end 42 of the lever is received and by means of which it is restrained against lateral movement. The nose iron operatively engages within bearing 134 secured to arm 131 which transmits the force of the lever directly to the counterbalancing spring.

In order to operate the chart in coordinated relation with the movements of the lever, a multi-armed bracket 135 is provided which is received over the end 42 of the lever, the lever being centrally apertured to freely receive arm 136 downwardly therethrough. Each of the outer arms engages a flattened boss 137 on the opposite side faces of the lever, and a pin 138 held in place by snap pin 139 maintains the desired relation while avoiding any substantial frictional force. The openings in the lower ends of arms 135 and 136 are preferably reamed to provide sufficient operating clearance so that there will be neither loose play nor any binding action against pin 138.

It will thus be seen that a substantial area of the arms of the bracket is in overlapping engagement with the sides of the lever so that the bracket is effectively held in proper operative alignment, and is effectively prevented from twisting out of the correct plane even in response to excessive or shock loads.

The central arm 136 of the bracket extends upwardly into the space between the two sections of the chart where at its upper end it carries a rack 140, the rack engaging a pinion 142, carried on the drum shaft 117. A branch arm 143 carries a weight 144 which normally acts in the direction to maintain the rack in operative engagement with the pinion.

From the above it will be seen that the drum chart rotates about an axis which is substantially parallel with the axis about which the lever moves. In addition, the rack 140 and the counterbalancing spring both lie in the central plane normal to the axis about which the lever pivots and thus are not differentially affected by any twisting of the lever caused by eccentric loading. This makes it possible to dissociate the spring and rack from any guiding relation of one to the other and to secure the proper guiding action solely from the lever. As shown, the rack is spaced from the center line of the counterbalancing means, and it is thus possible to utilize a single spring as distinguished from a plurality of springs symmetrically arranged about such center line.

It is desired to allow substantially complete freedom of movement of the rack and drum shaft during normal weighing operations so that they are substantially free of frictional drag which might adversely affect the accuracy of the indications, but at the same time to provide for maintaining proper operating conditions even under the application of shock loads, preventing the tendency of the rack and pinion teeth to disengage, and likewise avoiding any tendency toward excessive deflection or bending of the drum shaft itself.

As shown in Fig. 11, the bracket 125 is formed with a slot 145 which normally provides clearances to permit some small deflection of the shaft and to allow free rotation thereof in its normal position. However, any damaging deflection resulting from excessive load is prevented by the engaging of the shaft 117 with the side walls of the slot 145 before excessive deflection takes place. Similarly, an adjusting screw 147 is threadedly mounted in the bracket and secured in position by set screw 148 and thus the proper lateral clearances can be adjusted and maintained by proper adjustment of this screw 147.

In order to maintain the rack in proper position to engage the pinion, an arm 150 is mounted for axial travel in a drilled passage in bracket 125 extending in an upwardly inclined direction, the arm 150 carrying a pin 152 which extends across the rear end of rack 140. In its normal condition, pin 152 is clear of the rack and thus the rack operates without frictional drag. When however a shock load is applied, the rack has a tendency to travel outwardly and ride on the tips of its teeth, producing excessive wear both on its own teeth and on those of the pinion. In the present construction this is avoided by means of pin 152 which prevents excessive withdrawal of the teeth of the rack and pinion.

In order to adjust arm 150, it is provided with a milled arcuate slot 153 which normally faces upwardly as shown in Figs. 11 and 12. A set screw 154 threaded into bracket 125 may be set into the recess to retain the arm 150 in adjusted position. The arm 150 has a grooved portion 155 as shown in Fig. 9 within which there is received the head of an adjusting screw 156.

In order to obtain an accurate adjustment of the arm 150, set screw 154 is loosened, and adjusting screw 156 is turned to cause a micrometer movement either inward or outward of arm 150, under the guiding action established between the head of the screw 156 and the groove 155. When the proper setting has been obtained, set screw 154 is again tightened to maintain that adjustment. As long as the groove 153 of arm 150 remains on the upper side thereof, disengagement of the head of screw 156 from slot 155 is prevented. When disassembly is required, this may be readily accomplished by the turning of the arm 150 to bring the groove 153 toward the head of screw 156 whereupon the interlocking engagement is released and the arm as well as the screw may be separately removed.

In order to enclose the chart mechanism a partial housing section 160 is secured to the frame 112 and encloses the lower portion of the drum chart, a flexible sealing member 161 being secured around the lower portion of the frame and adapted to be engaged by the lower end of this housing section 160 as well as by the upper end of housing 55, thus establishing a completely sealed joint at this junction line.

Casing 160 has an inwardly and upwardly offset portion 164 which preferably extends in a substantially horizontal plane substantially around the entire circumference of the head or chart portion of the scale. Preferably a sealing strip 165 of rubber-like material is incorporated in the flange to maintain a closed and sealed condition.

The housing is completed by means of an upper casing portion 166 which fits downwardly against the seal 165, being held in place by means of screws 167 extending into the top plate 115 of the frame. Thus the entire chart is completely enclosed and access of foreign material thereto is prevented.

In order to provide for the viewing of the chart readings, a suitable lens 170 is mounted in an inclined portion of the casing directly over the reading index 122 on the clerk's side of the scale. This lens preferably provides a magnification of the readings to facilitate the observation thereof by the clerk. Similarly a plain glass window 172 is positioned on the customer's side of the scale opposite the index 123, enabling the customer to read the weight indications on the scale. Both the lens and the plain glass are properly secured and sealed in place in the casing so that the overall sealed enclosure of the scale is thus maintained.

It is sometimes desired to provide for the weighing of commodities which are wet and from which drainage should be allowed to take place, such for example as in the weighing of fish or the like from which the water should be allowed to flow while the fish are on the pan being weighed. The present invention is well adapted for such operations, providing for deflecting such discharged liquid so that it flows away from the top of the scale mechanism and downwardly over the sides where it cannot get into the interior of the scale. A suitable pan for this purpose is shown in Figs. 13 and 14. As there shown a pan 180 has a marginal rim 181 which extends upwardly above the main top surface shown at 182, the flange being continuous around the periphery except at one point adjacent the corner where it is relieved as shown at 183 to form a discharge passage. The platter preferably has the rearward and upwardly extending portion 184 and the downwardly depending lateral flanges 185 for the purposes already described. The main platter surface 182 slopes downwardly in all directions toward the discharge point 183 so that any liquid on the platter surface cannot escape over the rim 181 around the sides and toward the rear of the platter but is all deflected toward the common discharge point 183 from which it flows downwardly over flange 185 which overlaps with the lower casing wall 50. The liquid thus passes harmlessly from the platter onto the side casing wall and thence downwardly onto the supporting surface. If desired a suitable trough may be arranged beneath the casing and immediately in line with the discharge 183 to collect and remove the drainage therefrom.

The invention thus provides a highly satisfactory scale construction in which the scale is fully enclosed and protected against access of foreign matter, including both dust or dirt, as well as liquids, either in the weighing pan or as applied to the scale for the purpose of cleaning the outside thereof. The platter may be easily removed for cleaning, or for substitution of a different type of platter and quickly and accurately replaced. At all times the interior of the scale remains closed and sealed, even with the platter thus removed, and the mechanism itself is protected and maintained in proper operative condition notwithstanding the application of severe or shock loads to the platter.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a scale of the character described, the combination of a base, weighing mechanism supported in said base, weight indicating mechanism at one side of and projecting upwardly above said base, a casing enclosing the sides of said base and including a top plate overlying said weighing mechanism to prevent access of foreign matter thereto, platter supporting posts extending upwardly from said weighing mechanism, said plate having apertures therethrough for receiving said posts, a collar on each said post of a size fitting closely within the associated said aperture to maintain a sealed condition within said casing, said collars being correlated in vertical extent with the relative spacing of said weighing mechanism and said plate to extend at least partially through said apertures in the uppermost position of said weighing mechanism for preventing access of dust and dirt to the interior of said casing, means for adjustably positioning said collars in proper lateral relation to their respective said posts to fit said apertures, and a platter removably supported on said posts for ready removal and replacement, said platter covering the entire portion of said base and said casing at the side of said indicating mechanism and having a down-turned marginal flange downwardly overlapping the upper plane of said casing in the zero position of said weighing mechanism to prevent passage of foreign matter onto said top plate.

2. In a scale of the character described, the combination of a base, weighing mechanism supported in said base, weight indicating mechanism at one side of and projecting upwardly above said base, a casing enclosing the sides of said base and including a top plate overlying said weighing mechanism to prevent access of foreign matter thereto, platter supporting posts extending upwardly from said weighing mechanism through said plate and in substantially sealed relation therewith, and a platter removably supported on said posts for ready removal and replacement, said platter covering the entire portion of said base and said casing at the side of said indicating mechanism and having an upwardly extending flange on the side thereof adjacent said indicating mechanism and a down-turned marginal flange on the other three sides thereof, the upper surface of said platter having a peripheral upstanding rim extending in continuous relation around the circumference thereof between the ends of said upwardly extending flange thereon except for a discharge passage at one point, the surface of said platter sloping downwardly toward said point for discharge of liquid over said discharge platter, said down-turned flange on said platter extending into downwardly overlapping relation with the upper plane of said casing in the zero position of said weighing mechanism to direct said discharging liquid away from said top plate and to prevent passage of foreign matter onto said plate.

3. In a scale of the character described, a base, lever mechanism in said base, a platter adapted to be supported on said lever mechanism, an upright frame at one side of said base extending above the level of said platter, a drum chart rotatably supported on said frame, a casing enclosing said base and said frame, said casing including a top plate overlying said lever mechanism and an upwardly curved member extending across said base between said frame and said platter and above the level of said top plate, and the ends of said upwardly curved member extending downwardly to deflect material dropped on said upwardly curved member toward the sides of said base for preventing access thereof to the interior of said base.

4. In a scale of the character described, a base, lever mechanism in said base, a platter adapted to be supported on said lever mechanism, an upright frame at one side of said base extending above the level of said platter, a drum chart rotatably supported on said frame, said casing enclosing said base and said frame, said casing including an upwardly curved member extending laterally above said base between said frame and said platter and beneath a portion of said chart, the ends of said upwardly curved member extending downwardly to deflect material dropped on on said curved member toward the sides of said base, and said curved member including laterally projecting flanged portions along said ends and between said curved member and said platter for preventing said deflected material from passage into the interior of said base below said platter.

5. In a scale of the character described, a lever mounted for movement about an axis, a rotatable chart, a shaft supporting said chart for movement about an axis above said lever and substantially parallel with said lever axis, a pinion on said shaft, a rack adapted for engagement with said pin for actuating said chart, a pin pivotally connecting the lower end of said rack to said lever, a multi-armed bracket secured to said rack above said lever and extending downwardly therefrom on either side of thereof in bearing engagement with a substantial area of the sides of said lever to prevent twisting of said rack out of the correct plane in use, and the ends of said pin being received through said bracket for pivotally connecting said bracket to said lever on the same axis with said rack.

6. In a scale mechanism, a base, a lever mechanism in said base adapted to receive a platter thereon, a frame member mounted above said base, a drum chart rotatably supported on said frame member, counterbalancing mechanism for said lever mechanism, operating connections between said lever mechanism and said chart, lower housing means enclosing said base and having a part extending outwardly on all sides thereof for enclosing the lower portions of said frame and chart, said housing part being dimensioned at the upper end thereof to extend completely around the outline of said chart and the support therefor, and a separate upper housing member receivable downwardly in enclosing relation over the upper portions of said frame and said chart and meeting said outwardly extending part of said housing means around the entire circumference thereof, said upper housing member having the lower end thereof dimensioned to fit directly over said chart and said support therefor into engagement with said upper end of said lower housing part.

7. In a scale of the character described, the combination of a base, weighing mechanism supported in said base, a casing enclosing said base and preventing access of foreign matter thereto, and a platter removably supported on said weighing mechanism and having a down-turned peripheral flange downwardly overlapping said casing and preventing passage of foreign matter onto the top of said base, the upper surface of said platter having a peripheral upstanding rim extending in continuous relation around its circumference except for a discharge passage at one point, the surface of said platter sloping downwardly toward said point providing for the discharge of liquid from said platter and to the outside of said casing while preventing access thereof to the top of the scale and to the interior thereof.

8. In a scale, a base, weighing mechanism in said base, a housing enclosing the upper portion of said base and substantially preventing access of foreign matter thereto, a plurality of platter supporting post carried by said weighing mechanism, said housing having apertures for receiving said posts to effectively enclose and prevent access of foreign matter to said base, a collar on each post of a size fitting closely within said respective apertures to maintain a sealed condition within said scale, said collars being correlated in vertical extent with the relative spacing of said weighing mechanism and said housing to extend at least partially through said apertures in the uppermost position of said weighing mechanism for preventing access of dust and dirt to the interior of said housing, and means for adjustably positioning each of said collars in proper lateral relation to its respective post to fit said apertures.

9. In a scale, a base, a casing enclosing the sides of the base and having a peripheral flange extending around the top of the base and leaving the central portion thereof exposed, lever mechanism in said base, a plurality of platter supporting posts carried by said lever mechanism, and a sealing plate overlying said flange and cooperating with said casing to form a housing enclosing the central portion of said base, said plate having apertures for receiving said posts for allowing passage of said posts therethrough, collars on said posts adapted to be closely received in the respective apertures in said plate, said collars being correlated in vertical extent with the relative spacing of said weighing mechanism and said housing to extend at least partially through said apertures in the uppermost positions of said weighing mechanism, said housing including an upwardly flanged portion surrounding each of said openings, and means for adjusting said collars laterally of said posts for individual centering with respect to said apertures to establish a substantially sealed condition in said housing preventing access of foreign matter to said base upon removal of the platter.

10. In a scale of the character described, the combination of a base, lever mechanism in said base, a pair of posts extending upwardly from said lever mechanism for receiving the platter thereon, a platter removably received on said posts, and flanged members on the underside of said platter for engaging respectively against said pair of posts as said platter is moved laterally into operative position to facilitate rapid and accurate replacement of said platter, each of said flanged members including a concave central portion and side portions at either side of said central portion arranged at an angle of substantially less than 180° to engage said posts upon movement of said platter into operative position to guide said platter with respect to said posts into accurately seated relation of said posts in said concave portions of said flange members.

11. In a scale of the character described, the combination of a base, lever mechanism in said base, two pairs of posts extending upwardly from said lever mechanism for receiving the platter thereon, a platter removably received on said posts, flanged members on the underside of said platter for engaging respectively against one pair of said posts as said platter is moved laterally into operative position, each of said flanged members including a concave central portion and side portions at either side of said central portion arranged at an angle of substantially less than 180° to engage said posts upon movement of said platter into operative position to guide said platter with respect to said posts into accurately seated relation of said posts in said concave portions of said flange members, the remaining pair of said posts having recesses in the upper ends thereof, and pins on the underside of said platter and engageable in said recesses the remaining pair of posts to center the platter in operative position.

12. In a scale of the character described, a lever mounted for movement about an axis, a rotatable chart, a shaft on which said chart is mounted, a pinion on said shaft, means for mounting said chart for movment about an axis substantially parallel with said lever axis, a rack for actuating said chart, counterbalance mechanism, a nose iron on said lever for engagement with said counterbalance mechanism, a bracket rigidly secured to said rack above said lever and including a pair of arms extending downwardly in overlapping relation with the sides of said lever, and a pin received through said lever and said arms to form a pivotal connection therebetween, said arms and said lever being proportioned to maintain substantial areas of said overlapping portions thereof in bearing engagement preventing twisting of said rack out of the correct plane in use.

13. In a scale of the character described, the combination of a base having a relatively narrow rearward projection located centrally of said base, lever mechanism in said base having an operating end extending into said rearward projection, means for mounting said lever mechanism for pivotal movement about an axis extending transversely of said base, a drum chart, a frame for mounting said chart above said rearward projection and in overhanging relation with respect thereto, said drum chart being arranged in two sections with a central space therebetween, a counterbalancing spring supported by said frame and extending into said central space, a connection from said spring to said operating end of said lever mechanism, a rack also extending into said central passage for operating said chart, and means including a pin carried by said lever end forming a direct pivotal connection between said rack and said lever end independently of said connection between said spring and said lever end.

DAVID A. MEEKER.
KENNETH C. ALLEN.

References Cited in the file of this patent

UNITED STATES PATENTS

| Number | Name | Date |
|---|---|---|
| 1,280,936 | Zinke | Oct. 8, 1918 |
| 1,355,942 | Cross | Oct. 19, 1920 |
| 1,595,321 | Stimpson | Aug. 10, 1926 |
| 1,606,766 | King | Nov. 16, 1926 |
| 1,619,594 | Buechler | Mar. 1, 1927 |
| 1,877,064 | Schultz | Sept. 13, 1932 |
| 2,023,927 | Lawrence | Dec. 10, 1935 |
| 2,047,311 | Conners | July 14, 1936 |
| 2,073,912 | Walker | Mar. 16, 1937 |
| 2,098,846 | Weber et al. | Nov. 9, 1937 |
| 2,193,167 | Farwell, 3d, et al. | Mar. 12, 1940 |
| 2,279,706 | Hem | Apr. 14, 1942 |
| 2,287,695 | McMillan | June 23, 1942 |
| 2,287,814 | Meeker et al. | June 30, 1942 |
| 2,288,053 | Walter | June 30, 1942 |
| 2,311,264 | Stimpson | Feb. 16, 1943 |
| 2,333,703 | Conners | Nov. 9, 1943 |
| 2,383,404 | Meeker et al. | Aug. 21, 1945 |
| 2,432,006 | Haferl | Dec. 2, 1947 |

FOREIGN PATENTS

| Number | Country | Date |
|---|---|---|
| 352,331 | Great Britain | July 9, 1931 |